United States Patent
Kruglick (10) Patent No.: US 9,116,939 B2
(45) Date of Patent: Aug. 25, 2015

(54) TREE COMPARISON TO MANAGE PROGRESSIVE DATA STORE SWITCHOVER WITH ASSURED PERFORMANCE

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 161 days.

(21) Appl. No.: 13/816,134

(22) PCT Filed: Sep. 6, 2012

(86) PCT No.: PCT/US2012/054026
§ 371 (c)(1),
(2), (4) Date: Feb. 8, 2013

(87) PCT Pub. No.: WO2014/039045
PCT Pub. Date: Mar. 13, 2014

(65) Prior Publication Data
US 2014/0067872 A1 Mar. 6, 2014

(51) Int. Cl.
*G06F 17/30* (2006.01)
(52) U.S. Cl.
CPC .... *G06F 17/30327* (2013.01); *G06F 17/30079* (2013.01)
(58) Field of Classification Search
CPC ............... G06F 17/30327; G04F 17/30079
USPC ........................................................ 707/797
See application file for complete search history.

(56) References Cited

U.S. PATENT DOCUMENTS

| 7,778,972 | B1 | 8/2010 | Cormie et al. |
|---|---|---|---|
| 2003/0182312 | A1 | 9/2003 | Chen et al. |
| 2006/0112190 | A1 | 5/2006 | Hulten et al. |
| 2007/0077022 | A1 | 4/2007 | Iwatsu |
| 2007/0201470 | A1 | 8/2007 | Martinez et al. |
| 2010/0061394 | A1 | 3/2010 | Sindhu et al. |

FOREIGN PATENT DOCUMENTS

EP 0601550 B1 8/2001

OTHER PUBLICATIONS

International Search Report and Written Opinion for International Application PCT/US12/54026 filed Sep. 6, 2012, mailed Nov. 20, 2012.
Stoica, et al., "Chord: A Scalable Peer-to-peer Lookup Service for Internet Applications"; In the Proceedings of ACM SIGCOMM 2001, San Deigo, CA, Aug. 2001.

(Continued)

*Primary Examiner* — James Trujillo
*Assistant Examiner* — Grace Park
(74) *Attorney, Agent, or Firm* — Turk IP Law, LLC (57) ABSTRACT

Technologies are generally provided for progressive key value store switchover by evaluating a maturity of a migrated data store and allowing piecewise switching of substructure area query servicing from an origin data store to a destination data store. In some examples, abstractions of origin and destination tree structures may be compared to each other in order to generate an evaluation metric at substantially reduced performance evaluation load. The evaluation metric may target performance sampling while assuring a desired performance level with localized query servicing switchover. Piecewise data transfer may also be optionally enabled such that overall storage can be similar to the storage of a single data store copy while reducing an impact on existing data store services.

17 Claims, 7 Drawing Sheets

(56) References Cited

OTHER PUBLICATIONS

B. F Cooper et al., "PNUTS: Yahoo!'s hosted data serving platform," Proceedings of the VLDB Endowment 1, No. 2 (2008): 1277-1288.

F. Chang et al., "Bigtable: A distributed storage system for structured data," ACM Transactions on Computer Systems (TOCS) 26, No. 2 (2008): 1-26.

Michael J. Kamfonas, Recursive Hierarchies: The Relational Taboo!—The Relation Journal, Oct./Nov. 1992, http://www.kamfonas.com/id3.html.

Mandelbrot, B. B. "Self-affinity and fractal dimension." Physica Scripta 32 (1985): 257, 12 Pages.

Lee et al., Oracle Database Workload Performance Measurement and Tuning Toolkit; Faculty of Computer Science and Information Technology; University of Malaya, Kuala Lumpur, Malaysia; vol. 3, 2006. http://informingscience.org/proceedings/InSITE2006/IISITLee172.pdf.

Keogh et al., "Towards Parameter-free Data Mining." In Proceedings of the Tenth ACM SIGKDD International Conference on Knowledge Discovery and Data Mining, 206-215, 2004.

Wang et al. "A System for Approximate Tree Matching." IEEE Transactions on Knowledge and Data Engineering 6, No. 4 (Aug. 1994): 559-571.

Keogh et al., "Finding Surprising Patterns in a Time Series Database in Linear Time and Space." In Proceedings of the Eighth ACM SIGKDD International Conference on Knowledge Discovery and Data Mining, 550-556. ACM, 2002.

"A Basic Approach to Performance Measurement and Tuning," IBM Informix Dynamic Server Performance Guid, accessed at http://publib.boulder.ibm.com/infocenter/idshelp/v10/index.jsp?topic=com.ibm.perf.doc/perf39.htm, accessed on Oct. 9, 2014, p. 1.

"Amazon Simple Queue Service (Amazon SQS)," accessed at http://web.archive.org/web/20120717023409/http://aws.amazon.com/sqs/, accessed on Oct. 9, 2014, pp. 1-4

"Amazon Simple Storage Service (Amazon S3)," accessed at http://web.archive.org/web/20120904094743/http://aws.amazon.com/s3/, accessed on Oct. 9, 2014, pp. 1-5.

"Amazon SimpleDB (beta)," accessed at http://web.archive.org/web/20120901101837/http://aws.amazon.com/simpledb/, accessed on Oct. 9, 2014, pp. 1-7.

"B-tree," accessed at http://web.archive.org/web/20120622034948/https://en.wikipedia.org/wiki/B-tree, accessed on Oct. 9, 2014, pp. 1-12.

"Fractal dimension," accessed at http://web.archive.org/web/20120306123030/http://en.wikipedia.org/wiki/Fractal_dimension, accessed on Oct. 9, 2014, pp. 1-9.

"Hierarchical database model," Accessed at http://web.archive.org/web/20140407032335/http://en.wikipedia.org/wiki/Hierarchical_database_model, last modified on Mar. 11, 2014, pp. 1-4.

"How Amazon designs its highly available data store—The Replication," accessed at http://vandanat.blogspot.in/2011/02/how-amazon-designs-its-highly-available_08.html, published on Feb. 8, 2011, pp. 1-2.

"The Data Liberation Front," accessed at http://web.archive.org/web/20140123094034/http://www.dataliberation.org/, accessed on Oct. 9, 2014, p. 1.

"The Search for the Source of Data—How SimpleDB Differs From A RDBMS," accessed at http://web.archive.org/web/20120305190713/http://highscalability.com/search-source-data-how-simpledb-differs-rdbms, published on Apr. 21, 2008, pp. 1-9.

Consulting, B., "Using STATSPACK to monitor Oracle performance," accessed at http://web.archive.org/web/20120831095024/http://www.dba-oracle.com/art_statspack.htm, published on Apr. 11, 2001, pp. 1-12.

Keogh, E., et al., "LB_Keogh supports exact indexing of shapes under rotation invariance with arbitrary representations and distance measures," VLDB '06 Proceedings of the 32nd international conference on Very large data bases, pp. 882-893 (2006).

Lee, S. P., and Zildžić, D., "Oracle Database Workload Performance Measurement and Tunina Toolkit," Informing Science and Technology, vol. 3, pp. 1-11 (2006).

Mertz, D., "XML Matters: Putting XML in context with hierarchical, relational, and object-oriented models," accessed at http://web.archive.org/web/20120330212810/http://www.ibm.com/developerworks/xml/library/x-matters8/index.html, published on Apr. 1, 2001, pp. 1-6.

Modi, V., "SQL Server Index Tuning / Clustered vs Non-Clustered Indexes," accessed at http://web.archive.org/web/20120902150711/http://vijaymodi.wordpress.com/2007/03/24/sql-server-index-tuning-clustered-vs-non-clustered-indexes, published on Mar. 24, 2007, pp. 1-4.

Vogels, W., "Amazon's Dynamo," accessed at http://web.archive.org/web/20120902122549/http://www.allthingsdistributed.com/2007/10/amazons_dynamo.html, published on Oct. 2, 2007, pp. 1-25.

Wei, L., et al., "Efficiently Finding Unusual Shapes in Large Image Databases," Data Mining and Knowledge Discovery, vol. 17, pp. 343-376 (Apr. 8, 2008).

TREE COMPARISON TO MANAGE PROGRESSIVE DATA STORE SWITCHOVER WITH ASSURED PERFORMANCE

This Application is the National Stage filing under 35 U.S.C. §371 of PCT Application Ser. No. PCT/US12/54026 filed on Sep. 6, 2012. The PCT Application is herein incorporated by reference in its entirety.

BACKGROUND

Unless otherwise indicated herein, the materials described in this section are not prior art to the claims in this application and are not admitted to be prior art by inclusion in this section.

With the advance of networking and data storage technologies, an increasingly large number of computing services are being provided to users or customers by cloud-based datacenters that can enable access to computing resources at various levels. Cloud-based service providers may provide individuals and organizations with a range of solutions for systems deployment and operation. The success of cloud-based services means that more and more applications and databases are being moved to the cloud. Customers (or tenants) typically prefer to have the option of moving applications and databases from one service provider to another while maintaining service parameters like performance, cost, liability, and similar ones at similar levels. Service providers may prefer to have the option of moving an application or database from one site to another while maintaining performance and service level of the application.

Storing the databases used in applications that consume large amounts of data can be resource-expensive. Furthermore, moving a large database from an origin datacenter to a destination datacenter may also be expensive. Some practical implementations may take 30-60 days to fully transition a large database to a new datacenter if certainty of good performance is desired. During the transition, a copy of the database needs to be maintained at the datacenter of origin and destination, doubling storage costs.

Even without considering transport and computation costs, moving a database to a new datacenter and accomplishing acceptable performance may thus be costly for average customer databases and even prohibitively costly for larger databases resulting in customers avoiding transfers to new datacenters and limiting competition.

SUMMARY

The present disclosure generally describes technologies for providing progressive key value store migration in datacenter environments employing tree structure comparison based query switchover.

According to some examples, a method for progressive key value store migration through tree comparison may include one or more of retrieving an origin tree structure from an origin key value store and a corresponding destination tree structure from a destination key value store; abstracting data on the origin tree structure and the destination tree structure; determining whether the origin tree structure is replicated above a threshold in the destination tree structure; and directing queries intended for the origin tree structure to the destination tree structure if the origin tree structure is replicated above the threshold in the destination tree structure. Otherwise, the method may include directing queries intended for the origin tree structure to the origin tree structure.

According to other examples, a server for progressive key value store migration through tree comparison may include a memory configured to store instructions and a processor configured to execute a switchover manager within a migration application in conjunction with the stored instructions. The switchover manager may include an abstractor configured to retrieve an origin tree structure from an origin key value store and a corresponding destination tree structure from a destination key value store, and abstract data on the origin tree structure and the destination tree structure. The switchover manager may further include a comparator configured to compare the abstracted origin and destination tree structures; an evaluator configured to determine whether the origin tree structure is replicated above a threshold in the destination tree structure based on the comparison; and a director configured to direct queries to the destination tree structure if the origin tree structure is replicated above the threshold in the destination tree structure, else to direct queries intended for the origin tree structure to the origin tree structure.

According to further examples, a computer readable memory device may have instructions stored thereon for progressive key value store migration through tree comparison. The instructions may include retrieving an origin tree structure from an origin key value store and a corresponding destination tree structure from a destination key value store; abstracting data on the origin tree structure and the destination tree structure; comparing the abstracted origin and destination tree structures to determine whether the origin tree structure is replicated above a threshold in the destination tree structure; and directing queries intended for the origin tree structure to the destination tree structure if the origin tree structure is replicated above the threshold in the destination tree structure, else directing queries intended for the origin tree structure to the origin tree structure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to providing tree structure comparison based query switchover for gradual key value store migration in datacenter environments.

Briefly stated, technologies are generally provided for progressive key value store switchover by evaluating a maturity of a migrated data store and allowing piecewise switching of substructure area query servicing from an origin data store to a destination data store. In some examples, abstractions of origin and destination tree structures may be compared to each other in order to generate an evaluation metric at substantially reduced performance evaluation load. The evaluation metric may target performance sampling while assuring a desired performance level with localized query servicing switchover. Piecewise data transfer may also be optionally enabled such that overall storage can be similar to the storage of a single data store copy while reducing an impact on existing data store services.

Figure 1:
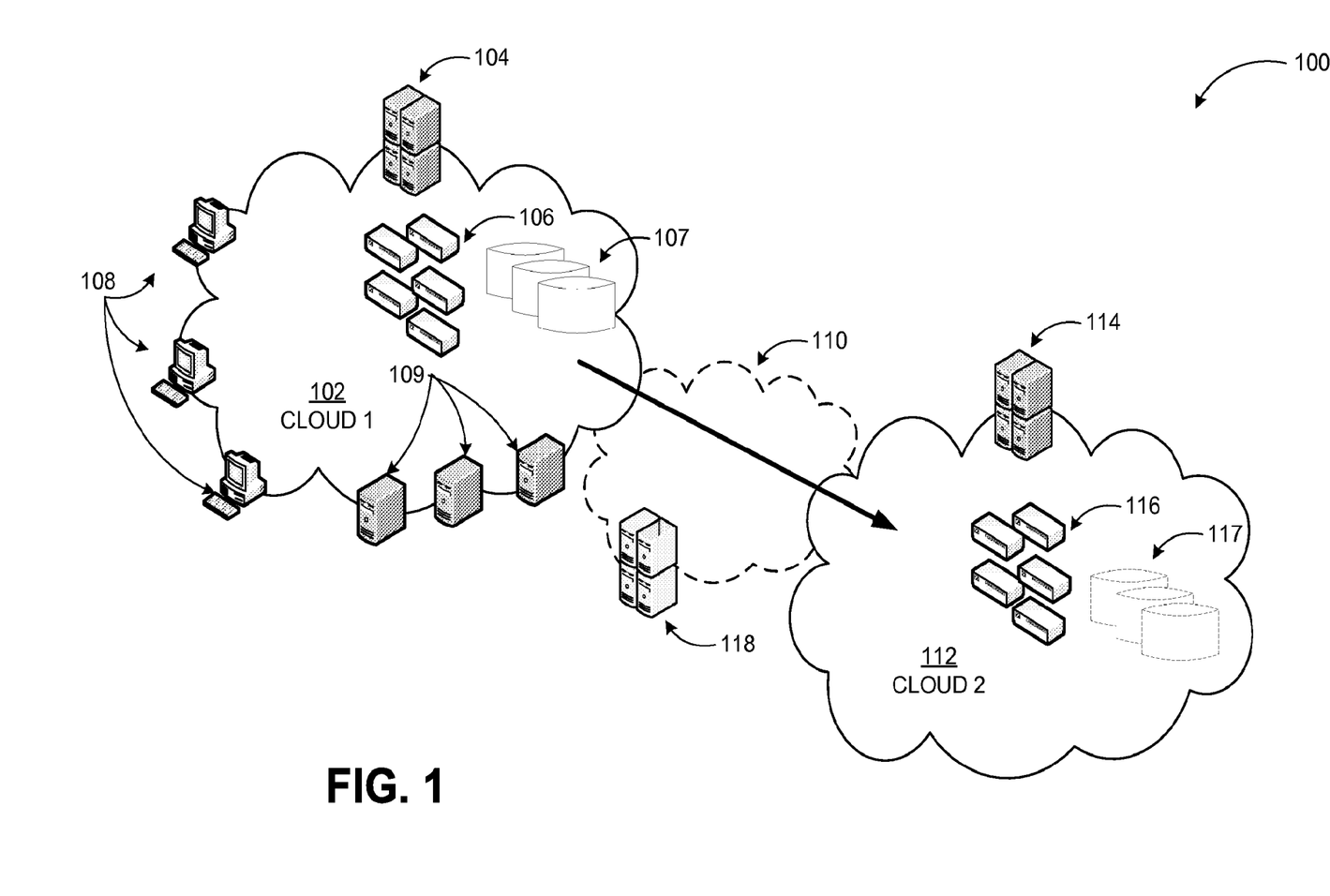
FIG. 1 illustrates an example datacenter migration, where tree structure comparison based query switchover may be employed for gradual migration with assured performance.

FIG. 1 illustrates an example datacenter migration, where tree structure comparison based query switchover may be employed for gradual migration with assured performance, arranged in accordance with at least some embodiments described herein.

As shown in a diagram 100, a service provider 102 (cloud 1) may host services such as various applications, data storage, data processing, or comparable ones for individual or enterprise customers 108 and 109. The service provider 102 may include one or more datacenters providing the services and employ one or more servers 104 and/or one or more special purpose devices 106 such as firewalls, routers, session managers, border gateways, network processors, and so on. To provide services to its customers, the service provider 102 may employ multiple servers, special purpose devices, physical or virtual data stores, etc. Thus, an application hosted or data stored by the service provider 102 for a customer may involve a complex architecture of hardware and software components. Depending on a type of service (type of application(s)), substantial amounts of data may be stored at the service provider 102. Large amounts of data may be managed through use of tree structures and key value stores.

When migrating a customer from one datacenter to another, an amount of data to be transferred, storage of the data (both at the origin datacenter and the target datacenter) during the transition, and maintaining performance may be priority considerations. In the diagram 100, the service provider 102 (cloud 1) may be an origin cloud (or datacenter) and a service provider 112 (cloud 2) may be a destination cloud (datacenter) in a migration process. Similar to the service provider 102, the service provider 112 may also employ one or more servers 114 and one or more special purpose devices 116 to provide its services. Progressive key value store switchover with assured performance through tree structure comparison may be managed and performed by one of the servers 104 of the service provider 102, one of the servers 114 of the service provider 112, or by a third party service executed on one or more servers 118 of another cloud 110.

In a system according to embodiments, piecewise transfer of a key value store may be enabled while retaining desired performance by determining which queries are ready to be serviced from the destination cloud. The desired performance may further be retained by determining which data is no longer needed at the origin cloud. Such a system may reduce the amount of duplicate data at any time while also affecting quality assurance on performance. An example system may be robust to differences in architecture or structure from one datacenter to another by enabling transfer of key value store(s) focusing on portions of the tree structures of the origin and destination datacenters. Thus, the overall structures (architecture) of the origin and destination datacenters may vary (even substantially), but the desired performance may be retained and the transfer performed efficiently regardless of the differences between the architectures.

Approaches, which stress producing a whole and fully operational destination data store and then performing a single event full switch from origin to destination datacenter once the destination tree structure is finalized, may take a long time. In comparison, a system according to embodiments may substantially lower storage and computational load, enable more graceful migration with whole store performance validation, and allow origin, destination, or third party migration management.

Figure 2:
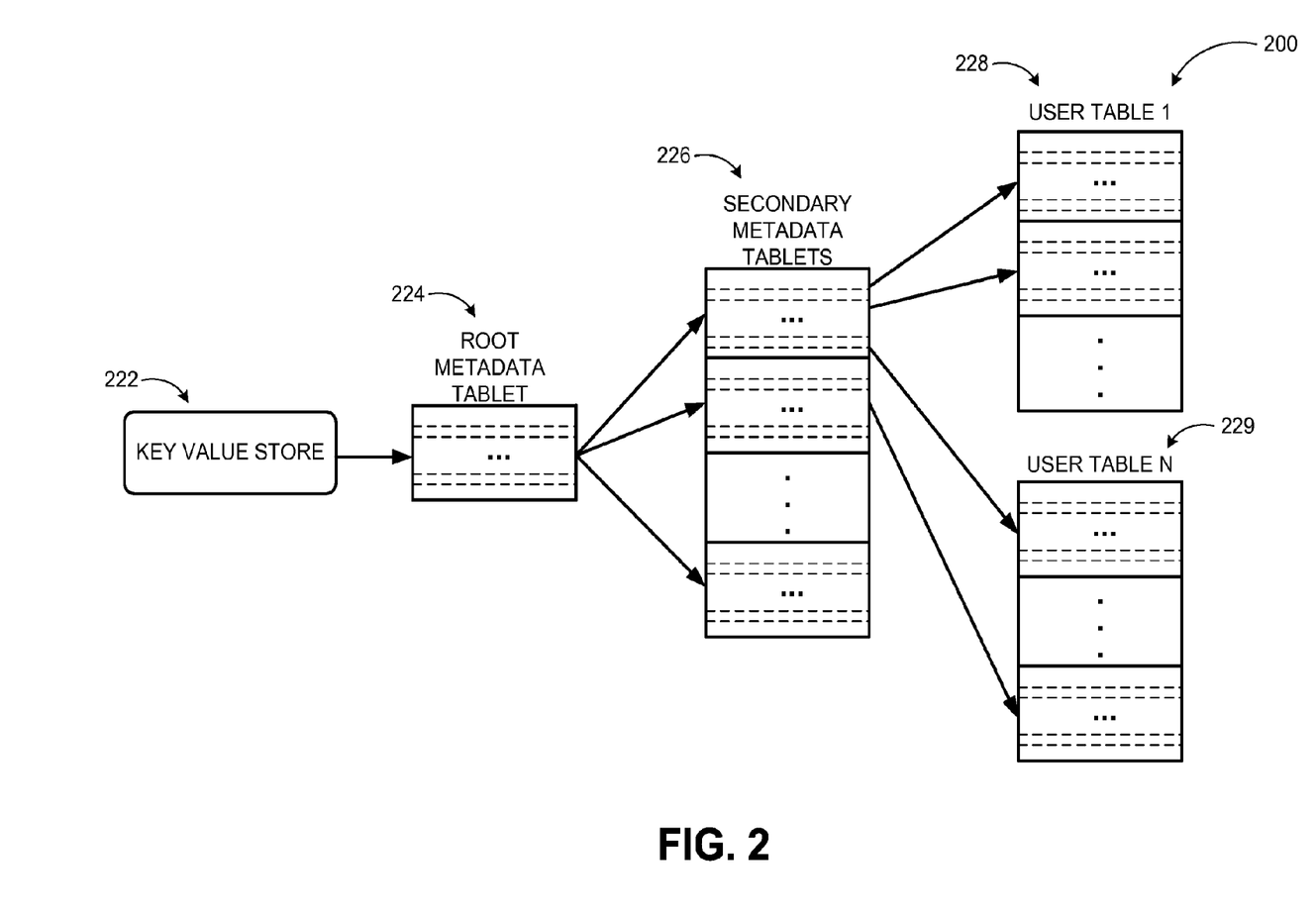
FIG. 2 illustrates an example key value store architecture and encompassed trees.

FIG. 2 illustrates an example key value store architecture and encompassed trees, arranged in accordance with at least some embodiments described herein.

As shown in a diagram 200, an example key value store 222 may include a relatively large (and complicated in some cases) tree structure. User data tables 228, 229 may be spread across many machines and be associated with multiple levels of metadata trees 226, which are used to find the location of each key value. At a top level of the tree structure, a root metadata table 224 may reside with as many layers of hierarchy as needed by the datacenter. The tree structure details may depend on storage architecture, redundancy, and structure of the datacenter.

Conventional techniques to duplicate performance may amount to the copying or re-derivation of trees. However, in most scenarios, a tree may not be simply imposed on the destination unmodified. When data storage strategies are different or when tree types are different, the new trees may need to be built up over time using query data.

In practice, however, a destination index tree may have similar structure and complexity, and local pockets of similarity in different arrangements and particulars than the origin tree. Thus, while tree access from an origin datacenter may be a help to building a destination index, additional maturing of the indices may be needed before the destination data store can perform acceptably. An example switchover system may provide a concerted mechanism for repeatedly checking the maturity of a new data store tree and switching query servicing over to the new data store when the tree meets (or satisfies) established maturity criteria. Such a system may even be able to direct individual queries based on the maturity of a particular segment of the data store tree, allowing gradual data store transfers.

Figure 3:
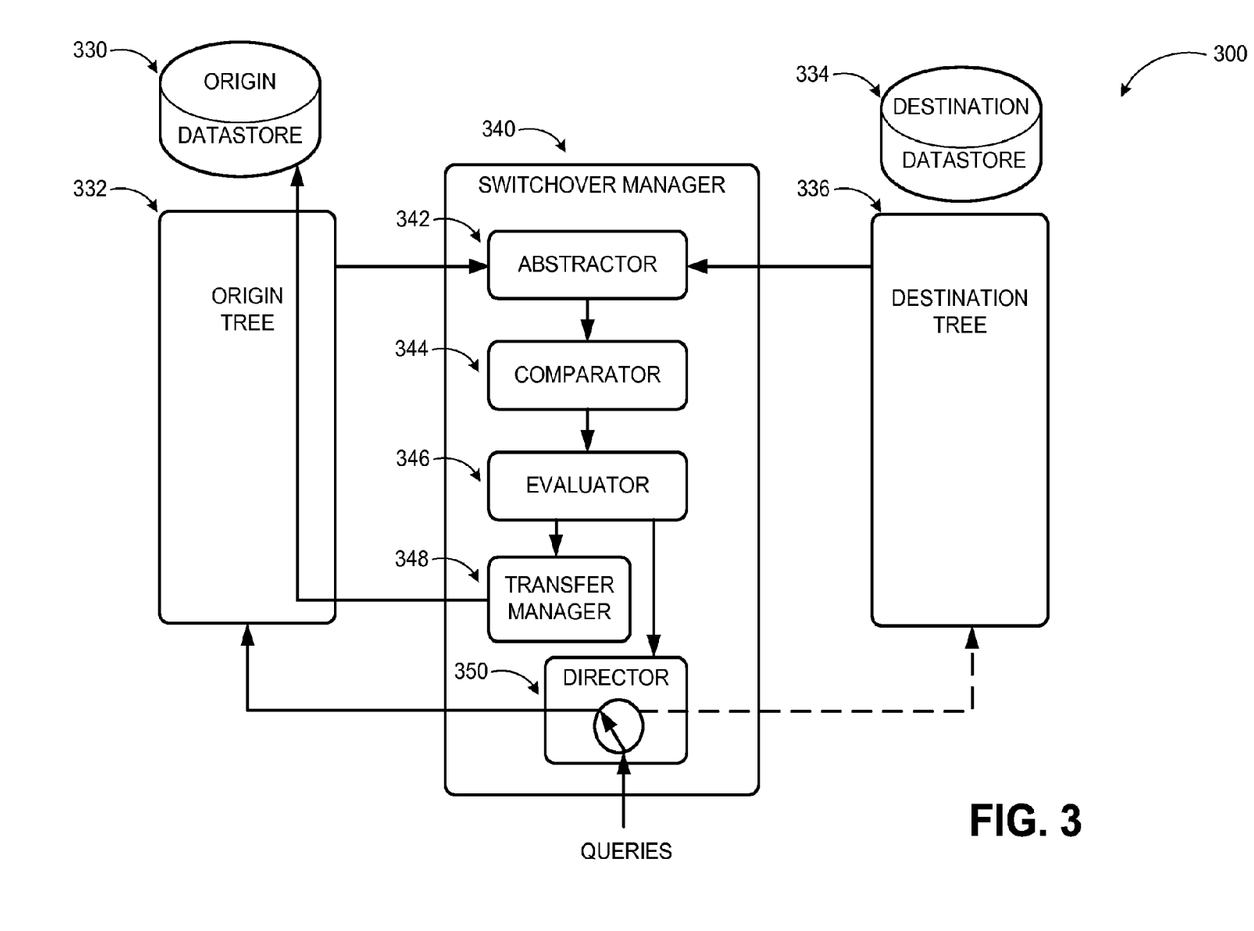
FIG. 3 illustrates example components of a system for enabling progressive key value store migration in datacenter environments through tree structure comparison based query switchover.

FIG. 3 illustrates example components of a system for enabling progressive key value store migration in datacenter environments through tree structure comparison based query switchover, arranged in accordance with at least some embodiments described herein.

As shown in a diagram 300, a switchover manager 340 for key value store migration may reside between an origin data store 330 with associated origin tree 332 and a destination data store 334 with destination tree 336. By way of example, a customer may be migrating from origin data store 330 to destination data store 334. The data stores may be in different datacenters or one data store may be a temporary emulated store, for example, placing both data stores within the same physical datacenter.

The switchover manager 340 may include, for example, an abstractor 342, a comparator 344, an evaluator 346, a transfer manager 348, and/or a director 350. The switchover manager 340 may include additional or fewer components with some of the tasks shared by existing components or split between other components. At the start of migration operations, the destination tree 336 may be in any state of construction from nonexistent to a starting state informed by some knowledge about the origin tree 332. The switchover manager 340 may evaluate the origin tree 332 and the destination tree 336 in whole or segment-wise iteratively by feeding data from the trees into the abstractor 342, which may convert the trees into abstracted form. The abstractor 342 may use, for example, symbolic approximation or fractal order evaluation to abstract the origin and destination trees.

The comparator 344 may receive the abstracted origin and destination trees and compare them to each other either in whole or segment-wise. Next, the evaluator 346 may examine each comparison to determine if each portion of the key value store tree has been replicated to a sufficient degree from the origin tree 332 to the destination tree 336. For example, the evaluator 346 may perform sample testing on the areas indicating targeted tree similarity. The degree of sufficiency may be predefined, for example, as a threshold which may be customizable. In some examples, the threshold of sufficiency may also be dynamic. For example, results from queries to the destination may be used to adjust the threshold during operation. In other examples, the migrating entity (e.g., the origin datacenter, the destination datacenter, or a third party entity) may provide the evaluator 346 with a threshold for sufficiency of tree similarity. In other examples, a customer whose data/application(s) are being migrated may define or customize the threshold. The evaluator 346 may then inform the director 350 that the compared portions of the origin and destination trees are sufficiently similar. Based on the received information, the director 350 may direct incoming queries to the origin tree 332 and the origin data store 330 if the portion of the tree relevant to the query has not yet been suitably replicated by the destination tree 336. The queries may be sent to the destination tree 336 and the destination data store 334 if the destination tree 336 has achieved sufficient quality in the relevant portion. The transfer manager 348 may move sections of data needed to mature the next segment of tree upon receiving sufficient similarity information from the evaluator 346. Once local areas of the origin data store 330 are adequately serviceable by the destination data store 334 and the destination tree 336, the data may be pruned from the origin data store 330 allowing incremental transfer of data and usage from origin to destination.

In one example scenario, the origin datacenter may obey data liberation principles, where a customer may have a right to access the origin tree 332 and the abstractor 342 may simply use that access via a proxy or secure link. In more adversarial scenarios, the origin tree 332 may need to be extracted without help from the origin datacenter, for example, by using cache access methods. Alternately, there may be a middle ground in which the origin and/or destination datacenters agree to provide abstracted data allowing the sharing of data needed for customers to migrate but without providing actual tree data that may reveal trade secrets.

A number of techniques may be employed for abstraction by the abstractor 342. The abstractor 342 may maintain an ability to compare gross structure and dependencies, which equate to cardinalities and indexing breakouts. The abstractor 342 may also be insensitive to local changes due to storage or architecture differences. Approximate Tree By Example (ATBE) is one example technique that may be used to abstract data from the trees. A more general approach may include symbolic approximation and tree comparison to find discords and motifs, and then match the structure of the origin tree 332 to the destination tree 336. Motifs may include substructures that recur from one sample to another, and discords are substructures that do not appear in one sample. Symbolic approximation may discover both. Further approaches may include sweeping through the trees for comparing symbolic approximations of trees. Employing any of these techniques or others, a metric may be generated that reflects differentness or sameness in a structure-free way such that key value store trees may be evaluated accurately for similarity of sub-tree areas (even if the trees have significant architectural differences).

In other examples, the trees may be measured via their fractal dimension. The fractal dimension may measure complexity qualities of trees. Comparisons of various sub- and super-level fractal dimensions may indicate whether the complexity of the destination tree 336 is approaching the complexity of the origin tree 332. With the fractal dimension technique, known trees may be characterized in advance to evaluate the relative fractal dimension change that may occur moving from one architecture to another.

The above-discussed abstraction and comparison techniques may produce a tree abstraction and a comparison metric on differing scales, allowing local and overall evaluation of the similarity between the tree structures. While ATBE and similar rigidly defined systems produce an absolute metric, benchmarking of different trees may be used in other cases to determine which value of similarity metric corresponds to which performance. Thus, the evaluator 346 may be allowed to trigger a switchover when the metric indicates performance of the destination tree 336 may reach a desired performance for replication.

In further examples, the evaluator 346 may include more comprehensive performance testing such as Monte Carlo performance queries within each sub-space of the destination tree 336 once the metric from the comparator 344 indicates performance goals are likely to be met. Such an approach may provide high level of certainty and eliminate a substantial amount of testing compared to performing large sample count query tests at each possible switchover time step. If the metric is fairly accurate, the destination tree 336 may have to be tested roughly once for each segment and the tests may be spread out over time as each segment of the tree matures. The margin of safety of the metric may also be reduced at the evaluator 346 to trigger earlier switchover with potentially higher error at the evaluator. The relatively higher error may be compensated by either more extensive detailed testing or more performance misses after switchover.

As the switchover progresses from the origin data store 330 to the destination data store 334, some parts of the origin data store may no longer be needed. The transfer manager 348 may be configured to remove surplus portions of the origin store 330 once switchover has rendered any portion no longer needed. While in some cases the destination data store 334 may be a whole copy made at the beginning of the customer migration process, the transfer manager 348 may also be used to selectively add data to the destination data store 334 as it becomes needed. For example, construction of the destination tree 336 may begin with a profile or transferred tree information. The destination tree 336 may then be informed by query observation. Data transfer from the origin data store 330 may not be used to build the destination data store 334 until a similarity metric has reached a value as judged by the comparator 344 or the evaluator 346. The metrics may then trigger the transfer manager 348 to copy a portion of the origin data store 330 to the destination data store 334. The copy event may happen well before performance at the destination tree 336 is sufficient, as the destination tree 334 may also need to be informed by the features of local storage optimizations for the destination data store 334. Thus, there may be one metric from the comparator 344 that triggers the transfer manager 348 to copy data from the origin data store 330 to the destination data store 334 and another metric from the evaluator 346 which may trigger switchover for a portion of the data stores.

Figure 4:
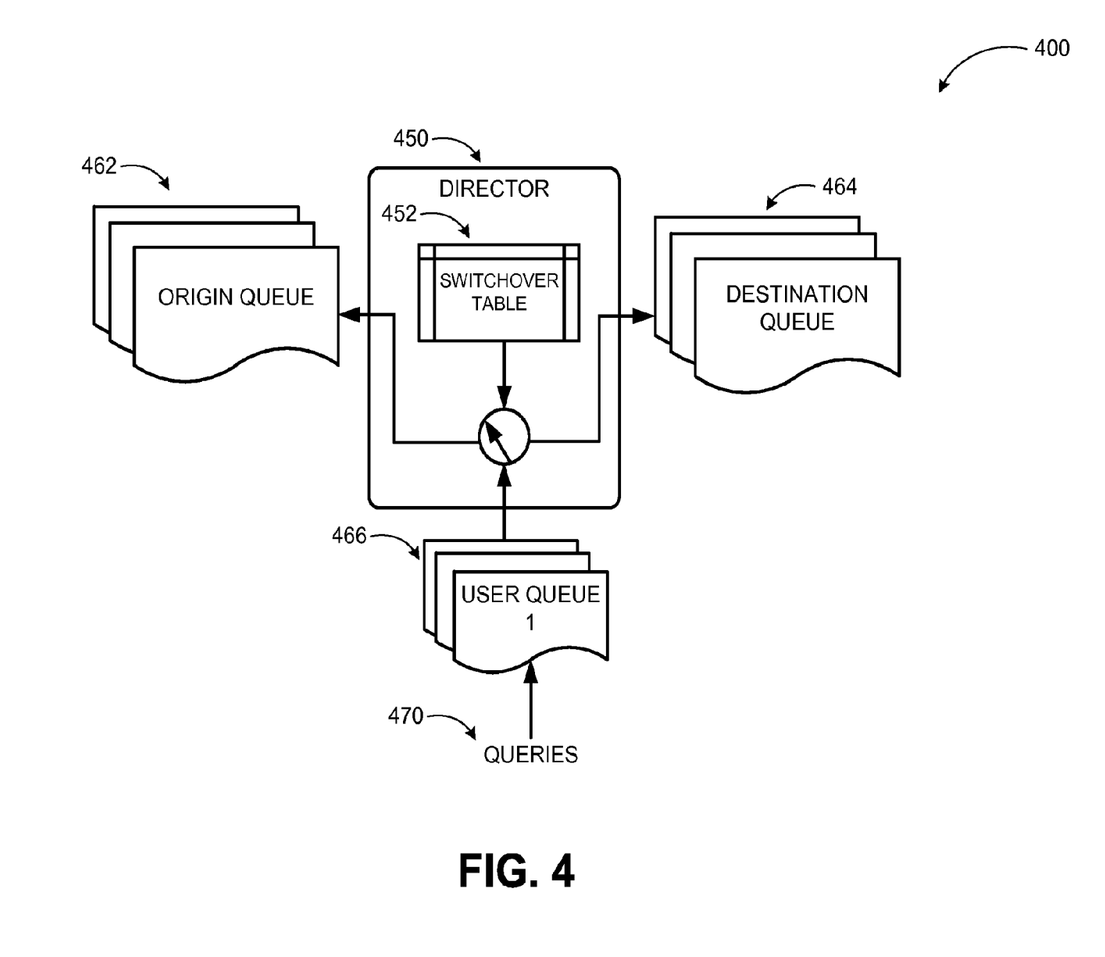
FIG. 4 illustrates details of an example director component's operations in a progressive key value store migration system.

FIG. 4 illustrates details of an example director component's operations in a progressive key value store migration system, arranged in accordance with at least some embodiments described herein.

An output of the evaluator may identify which portions of destination tree are ready to match the desired performance. This information may be stored in a switchover table 452 in the director 450, for example. The director 450 may be used to direct queries 470 to either the origin tree or the destination tree based on which portions of the destination tree the evaluator has judged ready to support switchover. This piecewise evaluation of the destination tree and direction of queries may allow for gradual switchover from the origin data store to the destination data store while maintaining performance.

Key value data stores often work through API calls made with query information in them. The API calls may arrive at a service (one of many parallel handlers in a service-oriented architecture), which may pre-process the included queries and place them in a queue. The queue in turn may be accessed and resolved by a series of query handlers each of which may access the data store tree for the requested data store and fetch the results. In some examples, as shown in a diagram 400, the director 450 may be implemented by adding two more queues. The director 450 may operate to transfer requests from a user queue 466 to either an origin queue 462 or a destination queue 464. Each of those queues may then be resolved by query handlers working on either the origin tree or the destination tree.

In some embodiments, the architecture of an example system may be specifically designed in a way that allows the whole system to be cross-datacenter. For example, the origin queue 462 may be at an origin datacenter and the destination queue 464 may be at a destination datacenter. The user queue 466 and the director 450 may be operated at either datacenter or even at a third party entity. In situations, where the entire switchover is being operated at a single datacenter, the origin queue 462 and the destination queue 464 may be a single queue. The director 450, in such situations, may perform the same effect as the queue separation simply by altering a data store indicator on the queries to indicate either the origin data store or the destination data store.

Figure 5:
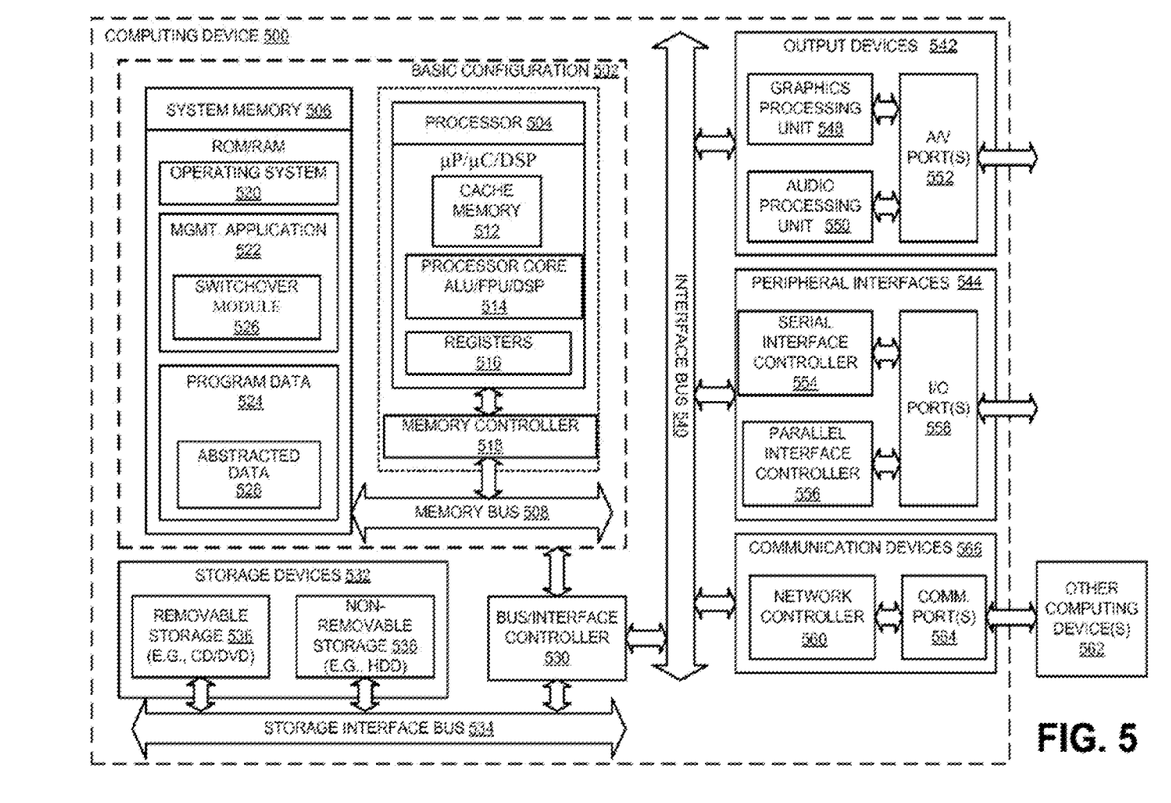
FIG. 5 illustrates a general purpose computing device, which may be used to implement tree structure comparison based query switchover for gradual key value store migration.

FIG. 5 illustrates a general purpose computing device 500, which may be used to implement tree structure comparison based query switchover for gradual key value store migration, arranged in accordance with at least some embodiments described herein. For example, the computing device 500 may be used as servers 104, 114, or 118 of FIG. 1. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a level cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications, and program data 524. The applications may include a management application 522 with a switchover module 526, which may employ tree comparison to manage progressive data store switchover with assured performance as described herein. The program data 524 may include, among other data, abstracted data 528, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for maintaining application performances upon transfer between cloud servers. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
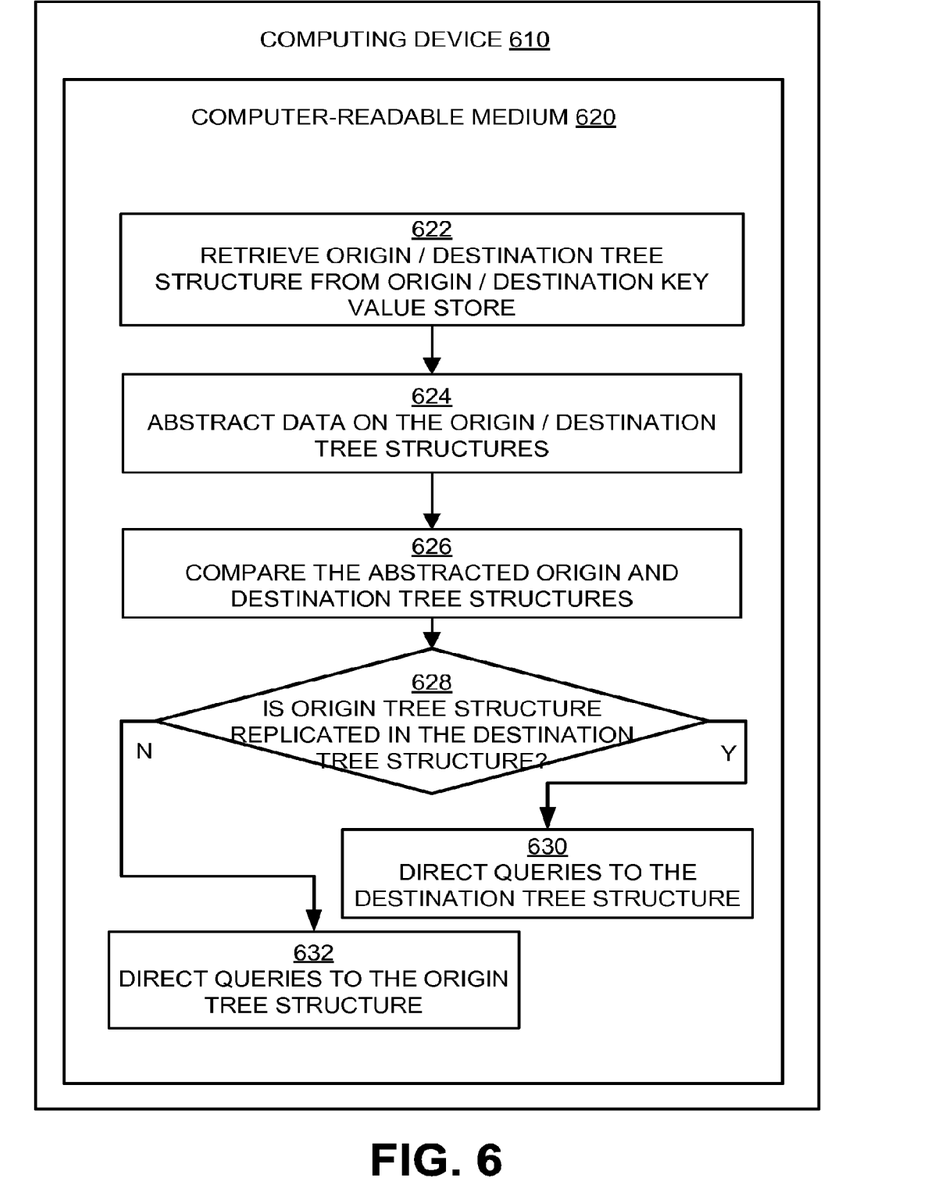
FIG. 6 is a flow diagram illustrating an example method for providing tree structure comparison based query switchover for gradual key value store migration that may be performed by a computing device such as the device in FIG. 5.

FIG. 6 is a flow diagram illustrating an example method for providing tree structure comparison based query switchover for gradual key value store migration that may be performed by a computing device such as the device 500 in FIG. 5, arranged in accordance with at least some embodiments described herein. Example methods may include one or more operations, functions or actions as illustrated by one or more of blocks 622, 624, 626, 628, 630, and/or 632. The operations described in the blocks 622 through 632 may also be stored as computer-executable instructions in a computer-readable medium such as a computer-readable medium 620 of a computing device 610.

An example process for providing tree structure comparison based query switchover for gradual key value store migration may begin with block 622, "RETRIEVE ORIGIN/DESTINATION TREE STRUCTURE FROM ORIGIN/DESTINATION KEY VALUE STORE", where a switchover module or management application (e.g., the switchover module 526) executed on an origin cloud server (e.g., the servers 104 of FIG. 1), a destination cloud server (e.g., the servers 114 of FIG. 1), or a third party server (e.g., the servers 118 of FIG. 1) may begin retrieving origin and/or destination tree structures from respective key value stores.

Block 622 may be followed by block 624, "ABSTRACT DATA ON THE ORIGIN/DESTINATION TREE STRUCTURES", where an abstractor within the switchover module 526 (e.g., the abstractor 342 of FIG. 3) may begin abstracting the data from the retrieved tree structures. Block 624 may be followed by block 626, "COMPARE THE ABSTRACTED ORIGIN AND DESTINATION TREE STRUCTURES", where a comparator of the switchover module 526 such as the comparator 344 of FIG. 3 may perform a comparison of the abstracted data. The comparison may be whole or piece-wise. The abstracted origin and destination tree structures may also be compared by performing sample testing on areas indicating targeted tree similarity or by performing comprehensive performance testing on the destination tree structure.

Block 626 may be followed by decision block 628, "IS ORIGIN TREE STRUCTURE REPLICATED IN THE DESTINATION TREE STRUCTURE?" where an evaluator of the switchover module 526 such as the evaluator 346 of FIG. 3 may determine if the origin tree structure is substantially replicated in the destination tree structure. If the origin tree structure is replicated in the destination tree structure, block 630, "DIRECT QUERIES TO THE DESTINATION TREE STRUCTURE", may follow block 628, where incoming queries are directed by the director 350 of FIG. 3 to the destination datacenter. If, on the other hand, the origin tree structure is not replicated in the destination tree structure, block 632, "DIRECT QUERIES TO THE ORIGIN TREE STRUCTURE", may follow block 628, where incoming queries continue to be directed by the director 350 of FIG. 3 to the origin datacenter.

The blocks included in the above described process are for illustration purposes. Providing tree structure comparison based query switchover for gradual key value store migration may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

Figure 7:
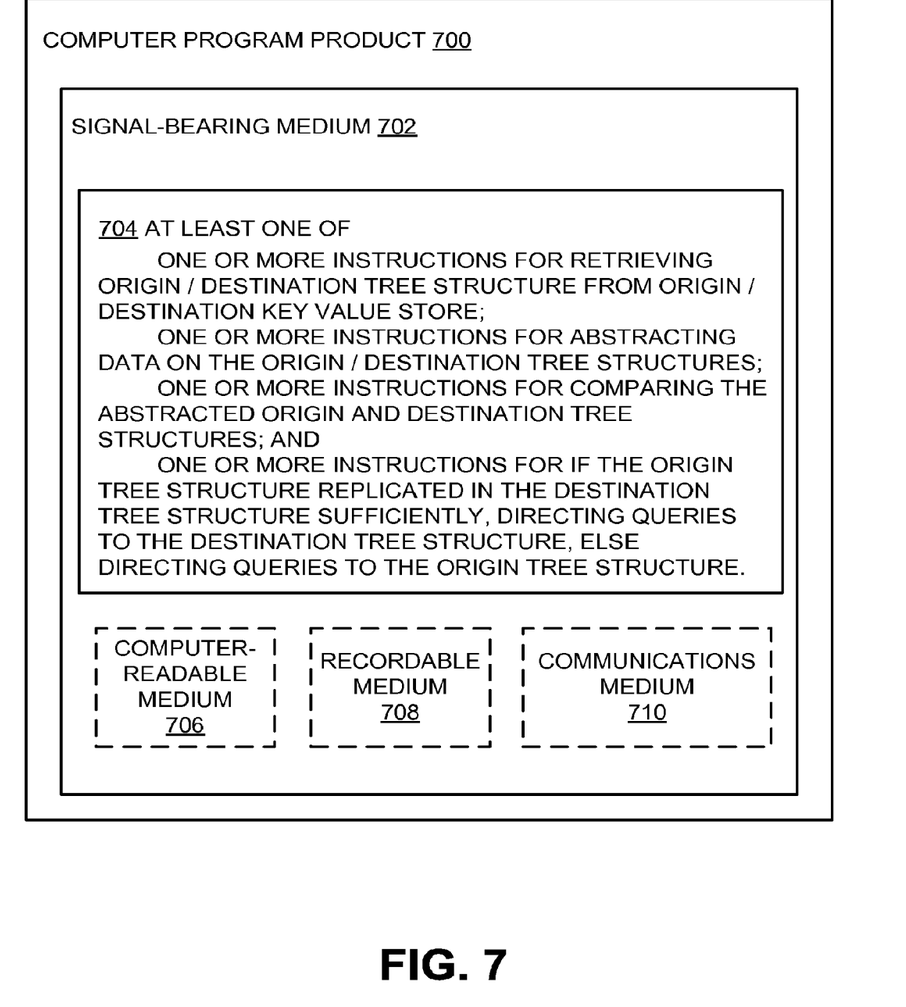
FIG. 7 illustrates a block diagram of an example computer program product, all arranged in accordance with at least some embodiments described herein.

FIG. 7 illustrates a block diagram of an example computer program product arranged in accordance with at least some embodiments described herein.

In some embodiments, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the switchover module 526 may undertake one or more of the tasks shown in FIG. 7 in response to the instructions 704 conveyed to the processor 504 by the medium 702 to perform actions associated with providing tree structure comparison based query switchover for gradual key value store migration as described herein. Some of those instructions may include, for example, instructions for retrieving origin/destination tree structure from origin/destination key value store; abstracting data on the origin/destination tree structures; comparing the abstracted origin and destination tree structures; and if the origin tree structure replicated in the destination tree structure sufficiently, directing queries to the destination tree structure, else directing queries to the origin tree structure according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some examples, a method for progressive key value store migration through tree comparison may include one or more of retrieving an origin tree structure from an origin key value store and a corresponding destination tree structure from a destination key value store; abstracting data on the origin tree structure and the destination tree structure; determining whether the origin tree structure is replicated above a threshold in the destination tree structure; and directing queries intended for the origin tree structure to the destination tree structure if the origin tree structure is replicated above the threshold in the destination tree structure. Otherwise, the method may include directing queries intended for the origin tree structure to the origin tree structure.

The method may include enabling a transfer manager to remove duplicate data from the origin key value store if the origin tree structure is replicated adequately in the destination tree structure. If the origin tree structure is not replicated above the threshold in the destination tree structure, the transfer manager may be enabled to move needed data to mature a next segment of the destination tree structure. The method may also include abstracting the data by one of approximate-tree-by example, symbolic approximation, or fractal order evaluation; determining whether the origin tree structure is replicated above a threshold in the destination tree structure by comparing the abstracted origin and destination tree structures.

The method may further include one or more of comparing the abstracted origin and destination tree structures in whole or piece-wise; comparing the abstracted origin and destination tree structures by performing sample testing on areas indicating targeted tree similarity; comparing the abstracted origin and destination tree structures by performing comprehensive performance testing on the destination tree structure; and/or employing Monte Carlo queries with each sub-space of the destination tree structure.

The method may also include storing matching tree structure segment information in a switchover table; using the switchover table to direct queries for a gradual switchover from the origin key value store to the destination key value store; and/or directing the queries to one of the origin key value store and the destination key value store by moving a query from a user queue to one of an origin queue and a destination queue depending on whether the origin tree structure is replicated above a threshold in the destination tree structure.

The origin key value store may be at an origin datacenter and the destination key value store may be at a distinct destination datacenter. The queries may be directed from a user queue to one of an origin queue and a destination queue, where the user queue resides at one of the origin datacenter, the destination datacenter, and a third party migration service provider, the origin queue resides at the origin datacenter, the destination queue resides at one of the destination datacenter and the third party migration service provider, and the directing is performed at one of the origin datacenter, the destination datacenter, and the third party migration service provider. The origin key value store and the destination key value store may be associated with an origin data store and a destination data store, respectively, within a same datacenter. The origin data store and the destination data store may also be of different types.

According to other examples, a server for progressive key value store migration through tree comparison may include a memory configured to store instructions and a processor configured to execute a switchover manager within a migration application in conjunction with the stored instructions. The switchover manager may include an abstractor configured to retrieve an origin tree structure from an origin key value store and a corresponding destination tree structure from a destination key value store, and abstract data on the origin tree structure and the destination tree structure. The switchover manager may further include a comparator configured to compare the abstracted origin and destination tree structures; an evaluator configured to determine whether the origin tree structure is replicated above a threshold in the destination tree structure based on the comparison; and a director configured to direct queries intended for the origin tree structure to the destination tree structure if the origin tree structure is replicated above the threshold in the destination tree structure, else to direct queries intended for the origin tree structure to the origin tree structure.

The switchover manager may further include a transfer manager that is configured to remove duplicate data from the origin key value store if the origin tree structure is replicated adequately in the destination tree structure. The transfer manager may also be further configured to move needed data to mature a next segment of the destination tree structure if the origin tree structure is not replicated above the threshold in the destination tree structure.

The abstractor may be configured to abstract the data by one of approximate-tree-by example, symbolic approximation, or fractal order evaluation. The comparator may be configured to compare the abstracted origin and destination tree structures in whole or piecewise, compare the abstracted origin and destination tree structures by performing sample testing on areas indicating targeted tree similarity, or compare the abstracted origin and destination tree structures by performing comprehensive performance testing on the destination tree structure. The comparator may also be configured to employ Monte Carlo queries with each sub-space of the destination tree structure.

The switchover manager may also store matching tree structure segment information in a switchover table and use the switchover table to direct queries for a gradual switchover from the origin key value store to the destination key value store. The director may be configured to direct the queries to one of the origin key value store and the destination key value store by moving a query from a user queue to one of an origin queue and a destination queue depending on whether the origin tree structure is replicated above the threshold in the destination tree structure.

The origin key value store may be at an origin datacenter and the destination key value store may be at a distinct destination datacenter. The server may be part of the origin datacenter, the destination datacenter, or a third party migration service provider, and the director may be configured to direct the queries from a user queue to one of an origin queue and a destination queue with the user queue residing at one of the origin datacenter and a third party migration service provider, the origin queue residing at the origin datacenter, and the destination queue residing at one of the destination datacenter and the third party migration service provider. The origin key value store and the destination key value store may be associated with an origin data store and a destination data store, respectively, within a same datacenter. The origin data store and the destination data store may be of different types.

According to further examples, a computer readable memory device may have instructions stored thereon for progressive key value store migration through tree comparison. The instructions may include retrieving an origin tree structure from an origin key value store and a corresponding destination tree structure from a destination key value store; abstracting data on the origin tree structure and the destination tree structure; comparing the abstracted origin and destination tree structures to determine whether the origin tree structure is replicated above a threshold in the destination tree structure; and directing queries intended for the origin tree structure to the destination tree structure if the origin tree structure is replicated above the threshold in the destination tree structure, else directing queries intended for the origin tree structure to the origin tree structure.

The instructions may include enabling a transfer manager to remove duplicate data from the origin key value store if the origin tree structure is replicated adequately in the destination tree structure. If the origin tree structure is not replicated above the threshold in the destination tree structure, the transfer manager may be enabled to move needed data to mature a next segment of the destination tree structure. The instructions may also include abstracting the data by one of approximate-tree-by example, symbolic approximation, or fractal order evaluation; determining whether the origin tree structure is replicated above a threshold in the destination tree structure by comparing the abstracted origin and destination tree structures.

The instructions may further include one or more of comparing the abstracted origin and destination tree structures in whole or piece-wise; comparing the abstracted origin and destination tree structures by performing sample testing on areas indicating targeted tree similarity; comparing the abstracted origin and destination tree structures by performing comprehensive performance testing on the destination tree structure; and/or employing Monte Carlo queries with each sub-space of the destination tree structure.

The instructions may also include storing matching tree structure segment information in a switchover table; using the switchover table to direct queries for a gradual switchover from the origin key value store to the destination key value store; and/or directing the queries to one of the origin key value store and the destination key value store by moving a query from a user queue to one of an origin queue and a destination queue depending on whether the origin tree structure is replicated above the threshold in the destination tree structure.

The origin key value store may be at an origin datacenter and the destination key value store may be at a distinct destination datacenter. The queries may be directed from a user queue to one of an origin queue and a destination queue, where the user queue resides at one of the origin datacenter and a third party migration service provider, the origin queue resides at the origin datacenter, the destination queue resides at one of the destination datacenter and the third party migration service provider, and the directing is performed at one of the origin datacenter, the destination datacenter, and the third party migration service provider. The origin key value store and the destination key value store may be associated with an origin data store and a destination data store, respectively, within a same datacenter. The origin data store and the destination data store may also be of different types.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular examples described in this application, which are intended as illustrations of various aspects. Many modifications and variations can be made without departing from its spirit and scope, as will be apparent to those skilled in the art.

Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for progressive key value store migration through tree comparison, the method comprising:
retrieving an origin tree structure associated with an origin key value store and a corresponding destination tree structure from a destination key value store;
abstracting data on the origin tree structure and the destination tree structure such that sharing of data needed for the migration is enabled while provision of actual data from the origin tree structure and the destination tree structure revealing confidential information is prevented;
comparing the abstracted origin and destination tree structures to determine whether the origin tree structure is replicated above a dynamic threshold in the destination tree structure; and
in response to determining that the origin tree structure is replicated above the dynamic threshold in the destination tree structure, directing queries to the destination tree structure, adjusting the dynamic threshold based on results from the queries directed to the destination tree structure, and enabling a transfer manager to remove duplicate data from the origin key value store, else
directing queries intended for the origin tree structure to the origin tree structure and enabling the transfer manager to move needed data to mature a next segment of the destination tree structure.

2. The method according to claim 1, further comprising:
abstracting the data by one of approximate-tree-by example, symbolic approximation, or fractal order evaluation.

3. The method according to claim 1, further comprising:
comparing the abstracted origin and destination tree structures by performing sample testing on areas indicating targeted tree similarity.

4. The method according to claim 1, further comprising:
comparing the abstracted origin and destination tree structures by performing comprehensive performance testing on the destination tree structure.

5. The method according to claim 1, further comprising:
storing matching tree structure segment information in a switchover table; and
using the switchover table to direct queries for a gradual switchover from the origin key value store to the destination key value store.

6. The method according to claim 1, further comprising:
directing the queries to one of the origin key value store and the destination key value store by moving a query from a user queue to one of an origin queue and a destination queue depending on whether the origin tree structure is replicated above the threshold in the destination tree structure.

7. The method according to claim 6, further comprising:
directing the queries from a user queue to one of an origin queue and a destination queue, wherein
the user queue resides at one of an origin datacenter, a destination datacenter, and a third party migration service provider,
the origin queue resides at the origin datacenter,
the destination queue resides at one of the destination datacenter and the third party migration service provider, and
the directing is performed at one of the origin datacenter, the destination datacenter, and the third party migration service provider.

8. A server for progressive key value store migration through tree comparison, the server comprising:
a memory configured to store instructions; and
a processor configured to execute a switchover manager within a migration application in conjunction with the stored instructions, wherein the switchover manager includes:
an abstractor configured to:
retrieve an origin tree structure from an origin key value store and a corresponding destination tree structure from a destination key value store, and
abstract data on the origin tree structure and the destination tree structure such that sharing of data needed for the migration is enabled while provision of actual data from the origin tree structure and the destination tree structure revealing confidential information is prevented;
a comparator configured to:
compare the abstracted origin and destination tree structures;
an evaluator configured to:
determine whether the origin tree structure is replicated above a dynamic threshold in the destination tree structure based on the comparison; and
a director configured to:
in response to determining that the origin tree structure is replicated above the dynamic threshold in the destination tree structure, direct queries intended for the origin tree structure to the destination tree structure, adjust the dynamic threshold based on results from the queries directed to the destination tree structure, and remove duplicate data from the origin key value store, else
direct queries intended for the origin tree structure to the origin tree structure and move needed data to mature a next segment of the destination tree structure.

9. The server according to claim 8, wherein the comparator is configured to compare the abstracted origin and destination tree structures in whole or piece-wise.

10. The server according to claim 8, wherein the comparator is configured to employ Monte Carlo queries with each sub-space of the destination tree structure.

11. The server according to claim 8, wherein the origin key value store is at an origin datacenter and the destination key value store is at a distinct destination datacenter.

12. The server according to claim 11, wherein the server is part of one of: the origin datacenter, the destination datacenter, and a third party migration service provider, and wherein the director is configured to direct the queries from a user queue to one of an origin queue and a destination queue with the user queue residing at one of the origin datacenter, the destination datacenter, and a third party migration service provider, the origin queue residing at the origin datacenter, and the destination queue residing at one of the destination datacenter and the third party migration service provider.

13. The server according to claim 8, wherein the origin key value store and the destination key value store are associated with an origin data store and a destination data store, respectively, within a same datacenter.

14. The server according to claim 13, wherein the origin data store and the destination data store are of different types.

15. A computer readable memory device with instructions stored thereon for progressive key value store migration through tree comparison, the instructions comprising:
   retrieving an origin tree structure from an origin key value store and a corresponding destination tree structure from a destination key value store;
   abstracting data on the origin tree structure and the destination tree structure such that sharing of data needed for the migration is enabled while provision of actual data from the origin tree structure and the destination tree structure revealing confidential information is prevented;
   comparing the abstracted origin and destination tree structures to determine whether the origin tree structure is replicated above a dynamic threshold in the destination tree structure; and
   in response to determining that the origin tree structure is replicated above the threshold in the destination tree structure, directing queries intended for the origin tree structure to the destination tree structure, adjusting the dynamic threshold based on results from the queries directed to the destination tree structure, and enabling a transfer manager to remove duplicate data from the origin key value store, else
   directing queries intended for the origin tree structure to the origin tree structure and enabling the transfer manager to move needed data to mature a next segment of the destination tree structure.

16. The computer readable memory device according to claim 15, wherein the instructions further comprise:
   storing matching tree structure segment information in a switchover table; and
   using the switchover table to direct queries for a gradual switchover from the origin key value store to the destination key value store.

17. The computer readable memory device according to claim 15, wherein the origin key value store is at an origin datacenter and the destination key value store is at a distinct destination datacenter and the instructions further comprise:
   directing the queries from a user queue to one of an origin queue and a destination queue, wherein
      the user queue resides at one of the origin datacenter, the destination datacenter, and a third party migration service provider,
      the origin queue resides at the origin datacenter,
      the destination queue resides at one of the destination datacenter and the third party migration service provider, and
      the directing is performed at one of the origin datacenter, the destination datacenter, and the third party migration service provider.

* * * * *